(No Model.)
H. A. BROOKS.
BICYCLE SUPPORT.
No. 531,674. Patented Jan. 1, 1895.
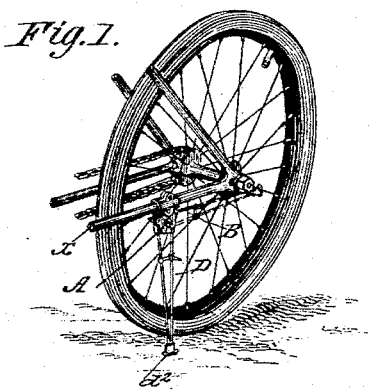
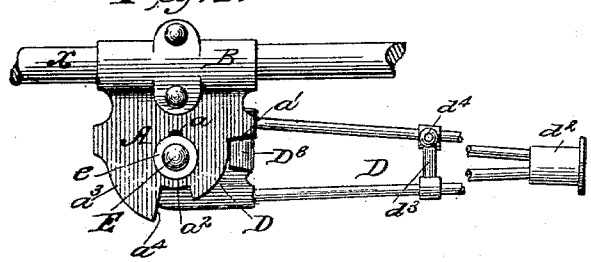
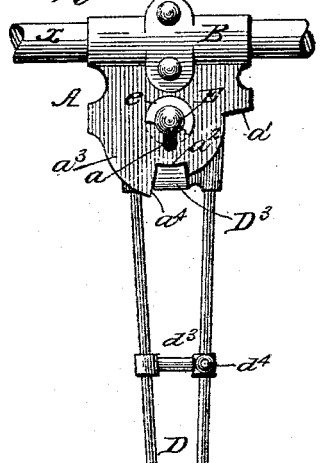
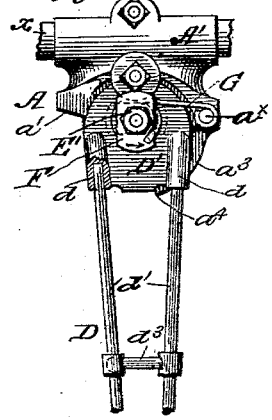
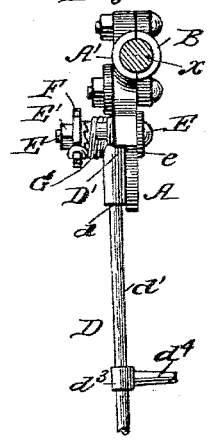
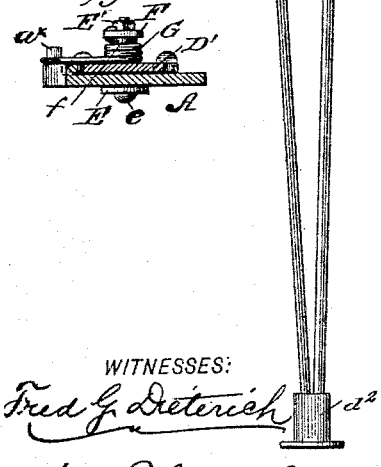
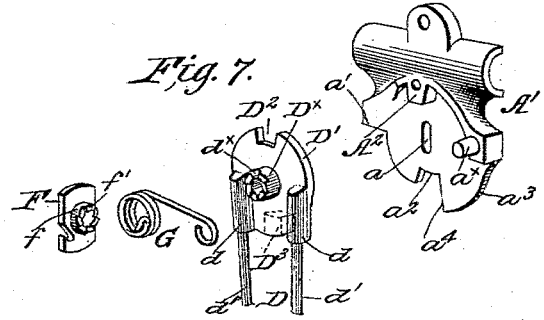
WITNESSES:
Fred G. Dieterich
Alf. D. Blondel
INVENTOR
Harry A. Brooks.
BY Munn & Co
ATTORNEYS.

UNITED STATES PATENT OFFICE.

HARRY A. BROOKS, OF RAPID CITY, SOUTH DAKOTA, ASSIGNOR OF TWO-THIRDS TO JOHN F. SCHRADER AND CLARENCE L. LEWIS, OF SAME PLACE.

BICYCLE-SUPPORT.

SPECIFICATION forming part of Letters Patent No. 531,674, dated January 1, 1895.

Application filed November 23, 1893. Serial No. 491,803. (No model.)

*To all whom it may concern:*

Be it known that I, HARRY A. BROOKS, residing at Rapid City, in the county of Pennington and State of South Dakota, have invented a new and Improved Bicycle-Support, of which the following is a specification.

My invention has for its object to provide a simple and inexpensive supporting device for bicycles which is adapted to be held locked to its supporting position by the weight of the machine, and to automatically swing up out of the way when such weight is removed.

It also has for its object to provide a device of this character, which can be quickly and detachably secured to the frame of any ordinary bicycle, without appearing clumsy or otherwise marring the general effect of the machine.

The invention consists in certain novel features of construction and peculiar combination of parts, all of which will hereinafter be first described in detail and then be particularly pointed out in the claims, reference being had to the accompanying drawings, in which—

Figure 1 is a perspective view of a portion of a bicycle showing my improved support applied, the same being shown to its normal or elevated position in dotted lines. Fig. 2 is a front view of the same showing the leg swung up to its normal position. Fig. 3 is a similar view with the leg down and the upper or pivot plate pressed down to a locked position. Fig. 4 is a rear view, the parts being in the position shown in Fig. 3. Fig. 5 is an edge view of the same. Fig. 6 is a horizontal section on the line 6—6 Fig. 4, and Fig. 7 is a detail view illustrating the spring supporting hub and the detachable tension plate hereinafter referred to.

Referring to the accompanying drawings, A indicates the attaching or main plate, which has at its upper end an integral laterally extended semi-circular socket portion, over which is adapted to fit and be secured a detachable socket plate B, such construction forming a convenient means for attaching the device to the bicycle, it, in practice, being secured to the horizontal member $x$, between the crank axle and the rear bearing as shown most clearly in Fig. 1 of the drawings.

The front plate A, has a central elongated slot $a$, a horizontal stop $a'$, at its rear edge, and a notch or recess $a^2$, in its lower edge, the front edge $a^3$ of which has a pendent projection, which forms a stop $a^4$ for a purpose presently explained.

On the rear face, the plate A, has at its upper end a curved rearwardly projecting portion A', the forward end, (that is the end toward the front of the machine,) of which terminates in a rearwardly projecting stud $a^x$, while its upper or central portion is formed with a downwardly projecting lug $A^2$ as shown most clearly in Fig. 7.

D indicates the supporting leg, which comprises a head plate D' the lower end of which has a socket $d$, in which fit rods $d'$, the lower ends of which converge and have secured at their ends a foot or rest member $d^2$, such rods being also braced by a connecting casting $d^3$, which has a projecting member $d^4$, adapted to be engaged by the foot of the rider when it is desired to swing the support down. The plate D' has a rearwardly projecting hub $D^x$, centrally apertured and formed on its outer edge with ratchet teeth $d^x$, and through such hub passes the pivot bolt or screw E, which bolt also passes through the central slot in the front plate, which slot is normally covered at the front by a washer $e$. At the upper end the plate D' has a notch $D^2$ and at its lower end projected from the front is a stop lug $D^3$.

F indicates a combined spring lock and tension plate, which has a hub $f$, on its inner face having ratchet teeth $f'$ which are adapted to be held in locked engagement with the teeth $d^x$ by the nut E' as most clearly shown in Fig. 5.

G indicates a coil spring which is wound about the hub $D^x$, and is so arranged as to normally throw and hold the supporting leg up to the position shown in dotted lines in Fig. 1, one end of which is secured to the plate F while the other is hooked onto the stud $a^x$, it being manifest that by turning the plate F in the direction indicated by the arrow in Fig. 4 and tightening the nut E', the tension of the spring will be increased.

Referring now more particularly to Fig. 2, it will be noticed, that when the leg is to its up or normal position its upward swing is limited by the stop lug $D^3$ engaging the stop $a'$.

When it is desired to support the machine, the driver pushes the leg down to a vertical position by pressing on the member $d^4$ with his foot, until the lug $D^3$ is in line with the notch $a^2$, the downward movement of the leg being limited by such lug engaging the stop $a^4$. When in this position the machine is slightly tilted to the support side, which throws the weight thereof on the plate A, and as such has a limited vertical movement on the pivot bolt E, it follows, that it will be depressed, and as it is, its lower notch $a^2$ will slip over the lug $D^3$, while the projection $A^2$ will enter the notch in the upper end of the plate D, and while the several parts are in such position the supporting leg will be firmly held in its vertical position. When however the machine is raised to a position ready for riding the weight thereof will be taken off the plate A, which rises with the bar to which it is secured, and thereby moves vertically on the bolt E and in consequence releases plate D', which then automatically swings up to the position shown in dotted lines in Fig. 1.

It will be understood that the several parts which form the leg can be connected by brazing, by screw joints or otherwise as may be desired.

Having thus described my invention, what I claim, and desire to secure by Letters Patent, is—

1. As an improvement in bicycles the combination with the main frame having a pendent pivotal plate formed with a vertically elongated pivot slot, and a lock notch in the same vertical alignment with such slot—of a leg member held to swing parallel with the machine having a pivot member and a lock lug, said pivot adapted when the support is swung down to an operative position to seat in the upper end of the pivot slot, and the lug in the lock notch of the aforesaid pendent plate, and spring actuated devices connected with the pivot plate and the leg member arranged substantially as shown whereby when the leg member is released of the tilting weight of the machine, it will force the bolt down into the lower end of the pivot slot, the lock lug out of engagement with the lock notch and swing the leg member up to an elevated position all substantially as and for the purposes described.

2. A supporting device for bicycles, comprising a pivot plate adapted to be secured to the bicycle, and having a lock notch at its lower end and a vertically elongated pivot slot, a leg member having a pivot plate formed with a central aperture, a pivot bolt fitting said aperture and elongated slot, said leg plate having a hub portion having ratchet teeth, and a lock stud at its lower edge, a spring secured at one end to the attaching plate, wound about the hub on the leg plate, a tension plate fitted on the pivot, connected to the free end of the spring and having ratchet teeth adapted to engage the ratchets on the hub, and the securing nut on the pivot bolt all arranged substantially as shown and described.

3. A supporting device for bicycles, comprising a fixed or pivot member, having a lock notch at its lower end, the front wall of which is projected to form a stop, and having a vertically elongated pivot slot, a leg member having a pivot plate, a pivot bolt connected therewith held to play in the elongated slot of the fixed plate, said leg pivot plate having a lug at its lower end, a spring connected with the leg and the fixed pivot plates, arranged to normally force the pivot bolt into the lower end of the slot and swing the leg plate with its lug normally in a horizontal plane with the pivot, said fixed plate adapted to be forced vertically downward by the weight of the bicycle when the leg plate is swung forward and its lug engages the stop on the said fixed plate, all substantially as shown and described.

4. As an improvement in bicycle supports, the combination with the fixed plate A having a stop $a'$ at its rear edge a notch $a^2$ in its lower edge, one wall of which is extended to form a stop $a^4$ and an elongated slot $a$, of the leg member D, having a head plate D' formed with a lug $D^3$ at its lower edge a toothed hub $D^\times$, the tension plate F having a toothed hub portion $f$ the spring G connected with plate F and plate A and the pivot bolt E all arranged substantially in the manner shown and for the purpose described.

HARRY A. BROOKS. [L. S.]

In presence of—
WILLIAM F. INDEA,
WILLIAM E. NOOGLAND.